INVENTOR
MAX O. KUHN
AND
JOHN P. SEDLAK, JR

By
ATTORNEYS

Patented Jan. 28, 1947

2,415,031

UNITED STATES PATENT OFFICE 2,415,031

SEALING CLOSURE

Max O. Kuhn, Cuyahoga Falls, and John P. Sedlak, Jr., Akron, Ohio, assignors to The Firestone Tire & Rubber Company, Akron, Ohio, a corporation of Ohio Application April 9, 1945, Serial No. 587,402

3 Claims. (Cl. 220—46)

This invention relates to sealing closures, and more especially it relates to closures such as comprise a sealing gasket, and are applied to a spout or similar member by being threaded thereonto so as to exert compressive stress upon the interposed gasket.

Sealing closures of the character mentioned ordinarily are so constructed that the gasket is subjected to friction and to torsional stress during the application of the closure and during removal thereof. Thus where the closure is applied and removed frequently, sometimes many times a day, the gasket may become roughened and mutilated, eventually requiring much greater effort to tighten the closure in order to obtain a seal capable of preventing leakage of fluid under high pressure.

The chief object of the invention is to provide an improved sealing closure of the character mentioned. More specifically the invention aims to provide a sealing closure of the character mentioned whereof the gasket will have longer useful life; wherein the gasket is not subject to frictional abrasion, and whereof the gasket is subjected to little, if any, torsional stress. A further object is to provide a gasket seat on which said gasket seats and seals, which gasket seat is protected from mutilation. Other objects will be manifest as the description proceeds.

Of the accompanying drawing.

Figure 1:
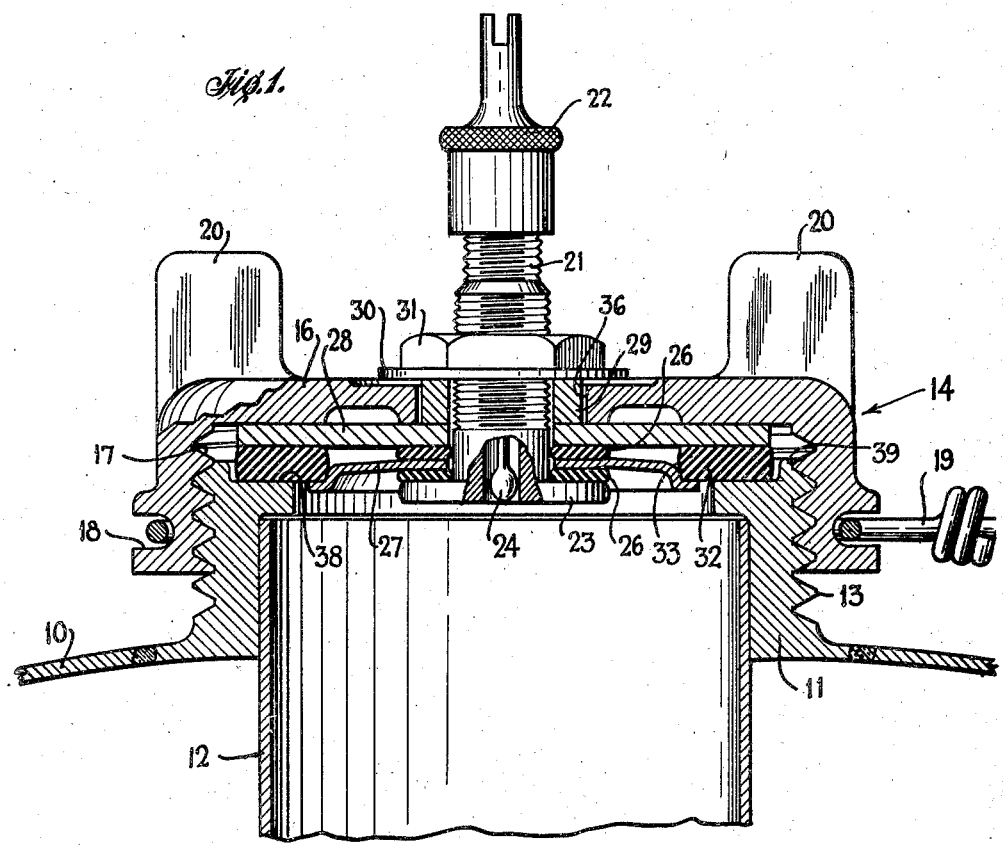
Figure 2:
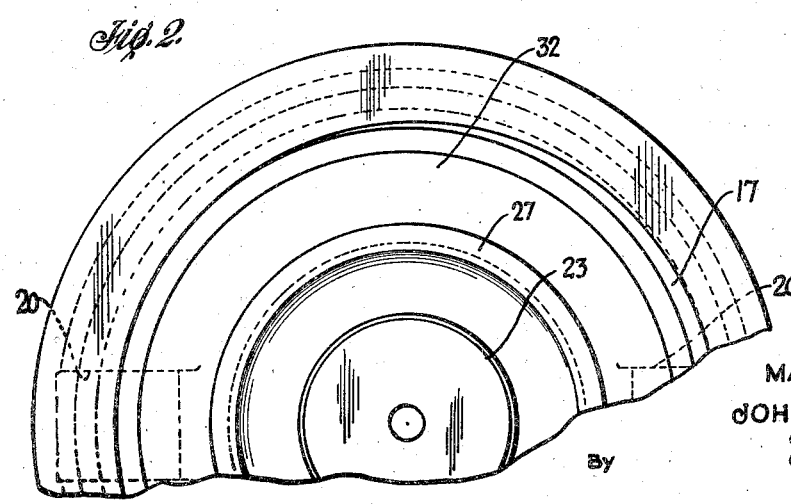

Fig. 1 is a diametric section through a sealing closure embodying the invention, and the filling neck or spout of a container upon which said closure is operatively mounted; and Fig. 2 is a fragmentary bottom plan view of the sealing closure.

Referring to Fig. 1 of the drawing, there is shown a portion of a tank or reservoir 10 that may be used, for example, in aircraft for containing a supply of oil under pressure. The tank 10 is provided with a neck 11 through which the tank may be filled, and through which air under pressure may be forced to maintain the contents of the tank under pressure. The neck 11 has a sleeve-like lining 12 that extends downwardly into the tank and constitutes a baffle that prevents fluid from splashing into the neck due to motion of the tank, as when the aircraft is in flight. The neck 11 is exteriorly threaded at 13 to receive the sealing closure, the latter being designated as a whole by the numeral 14.

The sealing closure 14 comprises a cap 16 that is formed with female threads 17 adapted for engagement with the threads 13 of the neck 11. The perimeter of the cap is formed with a circumferential groove 18 to receive a retaining cable or chain 19, whereby the closure may be connected to the tank to prevent loss of said closure. The cap 16 has its top side formed with a pair of diametrically opposed upstanding lugs 20, 20 providing a finger grip or tool grip when applying or removing the closure. The closure 14 also includes an axially disposed valve stem 21 through which air may be forced into the tank 10 to provide pressure on the contents thereof. The valve stem 21 is of the type that is conventionally used in the inner tubes of pneumatic tire casings and comprises the usual cap 22 on the outer end thereof and the usual base flange 23 at the inner end thereof. A portion of the valving mechanism within the stem is shown at 24.

Mounted upon the valve stem 21 are two washers 26, 26 of resilient material, an axially apertured gasket retaining disc 27, an axially apertured gasket backing disc 28, and a spacer sleeve 29, which members are clamped between the base flange 23 of the valve stem and a washer 30 that is urged toward said base flange 23 by a nut 31 that is threaded on the valve stem. One of the resilient washers 26 abuts the base flange 23 of the valve stem, and the gasket-retaining disc 27 is positioned between said washers 26 and extends radially outwardly therefrom. The peripheral portion of the retaining disc 27 overlies a narrow inner circumferential region of an annular gasket 32 and confines said gasket between itself and the gasket-backing disc 28. The peripheral region of the disc 27 is somewhat laterally offset from the remainder thereof to provide a peripheral shoulder 33 that abuts the inner circumference of the gasket 32, the arrangement being such as to maintain the gasket in concentric relation to the axis of the valve stem 21. The disc 27 is composed of flexible metal and when assembled with the other elements of the coupling, as shown in Fig. 1, is somewhat deformed or flexed so that it normally exerts pressure against the gasket 32 urging the latter against backing disc 28, so that no bonding means is required to hold the gasket in place. The spacer sleeve 29 encircles the valve stem 21 between the disc 28 and the washer 30.

The cap 16 is formed with an axial aperture 36 in which the spacing sleeve 29 is located, whereby the central region of the cap is positioned between the backing disc 28 and the washer 30. Said central region of the cap is of less thickness than the length of the sleeve 29, with the result that the cap 16 and the remainder of the coupling readily are movable angularly relatively of each other.

The tank neck 11 for which the improved closure is provided is formed at its upper end with a smooth circumferential seat 38 upon which the gasket 32 is receivable, and said seat preferably is depressed so that there is a raised portion or flange 39 that circumscribes it. The function of the flange 39 is to protect the gasket seat from defacement or mutilation by instrumentalities that may be employed for filling the tank with liquid. The outside diameter of the retaining disc 27 is substantially smaller than the inside diameter of the neck 11 at the seat 38 so that said disc can enter said neck, as shown.

When the closure is applied to the tank neck 11, the cap 16 is screwed down onto said neck until the gasket 32 is tightly confined between the backing disc 28 and the seat 38, during which operation the gasket is subjected only to compressive stress. There is no relative angular sliding movement between the gasket and its seat since the coefficient of friction therebetween is greater than the coefficient of friction between the metal backing disc 28 and the metal cap 16. Since the thickness of the cap is less than the distance between the backing disc 28 and the washer 30, the turning of the cap exerts no friction upon the said washer and accidental loosening of the nut 31 is avoided. Air may be forced into the tank 10 through the agency of the valve stem 21 at any time without disturbing the other elements of the closure, the resilient washers 26 preventing the escape of air from the tank along the exterior of the valve stem.

The invention provides a closure that operates in a simple manner to produce a tight seal, and will have longer useful life than other closures heretofore provided for similar use. If the gasket should require replacing, on occasion, the closure readily is disassembled to enable a new gasket to be mounted therein.

Modification may be resorted to without departing from the spirit of the invention, or the scope thereof as defined by the appended claims.

What is claimed is:

1. In a sealing closure, the combination of a cap formed with female threads adapted for engagement with male threads on a member to be closed, and an axial structure operatively connected to said cap and capable of rotary movement relatively thereof, said axial structure comprising a threaded stem extending through the cap and formed with a base flange at the inner end thereof, a gasket-backing disc on said stem abutting said cap, an annular gasket in face-to-face relation with said backing disc, a gasket-retaining disc on said stem engaging the inner circumferential region of said gasket, a washer of resilient material on the stem between the backing disc and the retaining disc, a washer of resilient material between the retaining disc and base flange of the stem, and a nut on the stem urging the backing plate toward the stem flange to compress said washers and thus seal the cap against escape of fluid along the outside of the stem.

2. A combination as defined in claim 1 including a spacer sleeve on the stem between the nut and gasket-backing disc, the length of said sleeve being greater than the thickness of the cap, the cap being formed with a central aperture in which said sleeve is located.

3. A combination as defined in claim 1 whereof the axial stem is formed with an axial bore, including valve mechanism located in said bore.

MAX O. KUHN.
JOHN P. SEDLAK, Jr.